United States Patent [19]
Wycoff

[11] 3,932,824
[45] Jan. 13, 1976

[54] SIGNAL SELECTIVE CIRCUIT
[76] Inventor: Keith H. Wycoff, P.O. Box 308, Lexington, Nebr. 68850
[22] Filed: Oct. 17, 1974
[21] Appl. No.: 515,505

Related U.S. Application Data
[60] Continuation of Ser. No. 17,233, March 6, 1970, abandoned, which is a division of Ser. No. 666,645, Sept. 11, 1967, Pat. No. 3,597,690.

[52] U.S. Cl. ............................ 333/70 R; 334/56
[51] Int. Cl.² .......................................... H03H 7/10
[58] Field of Search ............................ 333/70 R; 334/56–58, 71, 72–77; 336/107, 147, 150; 339/18 R, 18 P, 18 C, 222

[56] References Cited
UNITED STATES PATENTS

| | | | |
|---|---|---|---|
| 1,127,738 | 2/1915 | Coughenour | 336/150 |
| 1,463,304 | 7/1923 | Bingay | 336/147 X |
| 1,971,872 | 8/1934 | O'Brien | 336/150 X |
| 2,310,797 | 2/1943 | Lea | 334/56 X |
| 2,761,066 | 8/1956 | Robinson | 334/56 X |
| 2,995,656 | 8/1961 | Sneath | 334/56 |
| 3,264,566 | 8/1966 | Kaufman et al. | 334/56 X |
| 3,281,747 | 10/1966 | Winsand | 336/107 X |
| 3,427,569 | 2/1969 | Abramson | 334/56 |
| 3,486,076 | 12/1969 | Abbott et al. | 339/18 C X |

FOREIGN PATENTS OR APPLICATIONS

| 110,547 | 5/1940 | Australia | 334/56 |
|---|---|---|---|

Primary Examiner—Paul L. Gensler
Attorney, Agent, or Firm—Prangley, Dithmar, Vogel, Sandler & Stotland

[57] ABSTRACT

In one aspect, the circuit has a first impedance element which preferably is in the form of a tapped inductor with a plurality of taps thereon, and a second impedance element which preferably is in the form of a capacitor. One terminal of the capacitor is connected to a terminal of the inductor, the other terminal of the capacitor is movably connected to a selected one of the taps. The circuit is tuned to a resonant frequency determined by the value of the capacitor and the value of inductance associated with the selected tap. The taps are located on the inductor to cause each resonant frequency to be a substantially fixed percentage greater than the next lower one of the resonant frequencies. In one embodiment, a connector plug is provided, having a first portion with a terminal connected to the capacitor; a second portion with terminals connected to the taps on the inductor; and a third portion matable with the second and third portions. The third portion is provided with means to cause the terminal on the first portion to be connected to a selected one of the terminals of the second portion.

13 Claims, 6 Drawing Figures

SIGNAL SELECTIVE CIRCUIT

This application is a continuation of application Ser. No. 17,233 filed 3-6-70 for TAPPED FILTER, now abandoned which in turn, is a divisional of Application Ser. No. 666,645 filed 9-11-67 for TONE CONTROL CIRCUIT HAVING A FREQUENCY-CONTROLLABLE FILTER, now U.S. Pat. No. 3,597,690.

An important object of the invention is to provide an improved filter for use in a selective calling communication receiver.

Another object is to maximize the use of a given frequency spectrum by maximizing the number of usable tones therein.

Still another object is to provide a tapped filter which is tunable to a plurality of resonant frequencies, each resonant frequency being a fixed percentage greater than the next lower resonant frequency.

Yet another object is to provide a resonant circuit having a connector plug, which can be set up to tune the resonant circuit to a desired resonant frequency.

A yet further object is to provide a connector plug which can be programmed to establish the response characteristics of a sequential signal selective circuit.

In summary, there is provided a tapped filter for use in a communications receiver and comprising a first impedance element having an input terminal and a plurality of taps thereon providing a corresponding plurality of impedances respectively between the taps and the input terminal, a second impedance element having an output terminal and having an input terminal connected to the input terminal of the first impedance element, and a movable connection for interconnecting the output terminal of the second impedance element to a selected one of the taps, thereby to cause the filter to be tuned to a resonant frequency determined by the value of the second impedance element and the value of the impedance between the input terminal of the first impedance element and the selected tap thereon, the taps being located on the first impedance element to cause each resonant frequency to be a substantially fixed percentage greater than the next lower one of the resonant frequencies.

In a preferred form, the first impedance element is an inductor having a plurality of taps thereon, and the second impedance element is a capacitor. In another form of the invention, the connections between the first and second impedance elements are made by electronic switching devices.

In still another form, there is provided a connector plug including first and second and third portions, the first portion having a plurality of terminals fixedly coupled respectively to the taps on the inductor, the second portion having a terminal fixedly coupled to the capacitor output terminal, the third portion having a plurality of first terminals respectively matable with the terminals of the first portion and having a second terminal matable with the terminals of the second portion, and means associated with the third portion for connecting the first terminal to a selected one of the second terminals, whereby mating the third portion with the first and second portions operates to connect a selected tap of the inductor to the capacitor output terminal.

Further features of the invention pertain to the particular arrangements of the elements of the signal selective circuit, thereby to achieve the above outlined and additional objects thereof.

The invention, both as to its organization and method of operation, together with further objects and advantages thereof will best be understood by reference to the following specification taken in connection with the accompanying drawings, in which.

The principles of the present invention are equally applicable to communication systems utilizing wire lines, modulated supersonic signals, AM radio signals, and FM radio signals. For illustrative purposes, the following explanation refers to a receiver responsive to FM radio signals. Those skilled in the art will readily understand that the various principles to be described hereinafter in conjunction with the system employing FM radio signals can be readily adjusted to the other types of communication systems using other forms of transmission such as those set forth above.

Figure 1:
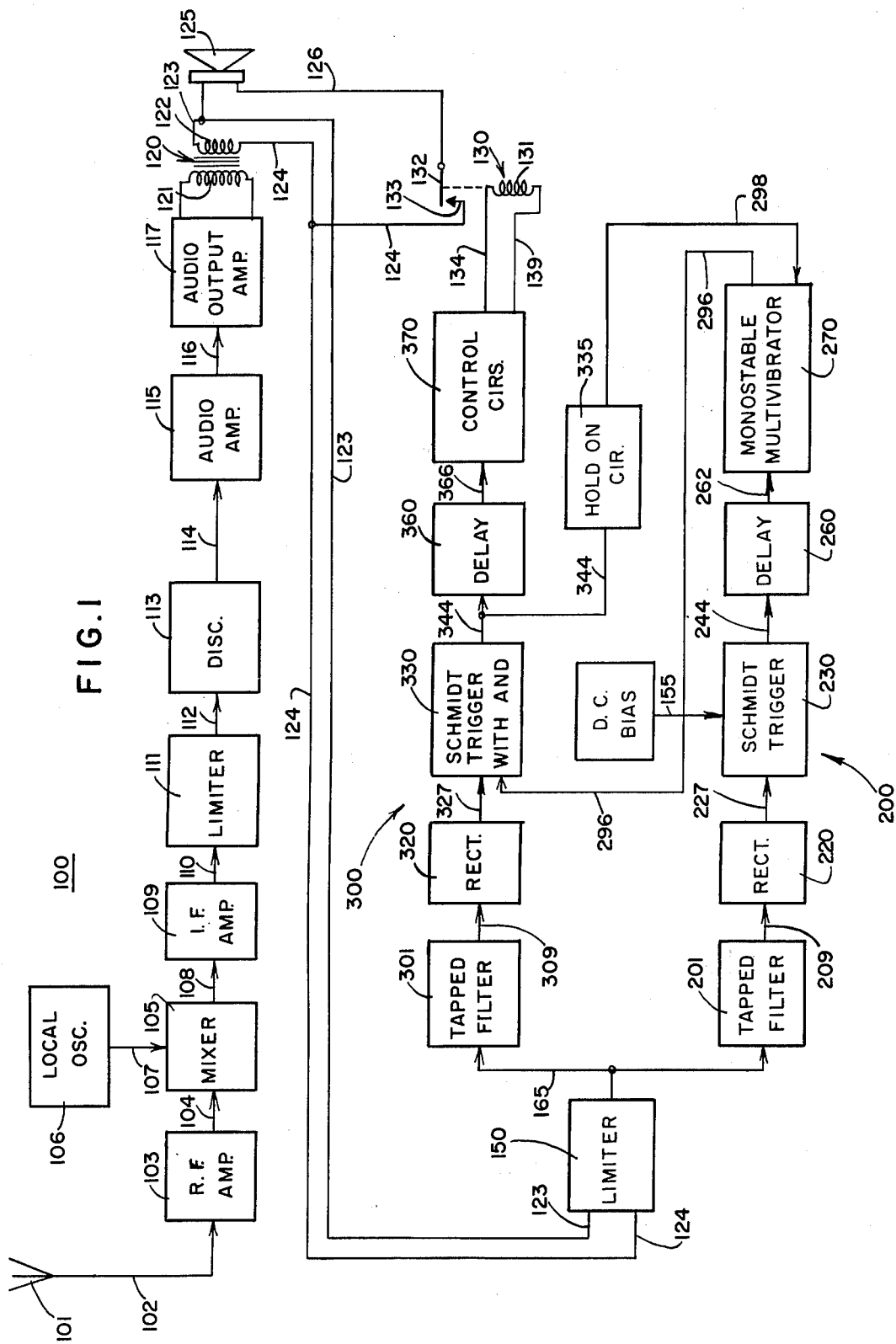
FIG. 1 is a schematic and block diagram of a receiver including tapped filters made in accordance with and embodying the principles of the present invention.

Referring now to FIG. 1 of the drawings, there is shown a communication receiver 100 adapted to respond to a radio frequency carrier wave modulated by a sequence of tones. The transmitter which produces that carrier wave can generate a sequence of tones, for example, a sequence of two tones, three tones, . . . seven tones, etc., the tone sequence being preferably generated automatically after being encoded therein. Furthermore, alternate tones in the tone sequence are selected from two different groups of tones in two different bands of audio frequencies. For example, the first, third, fifth, etc. tones would be selected from a first group of tones in a first band of frequencies, while the second, fourth, sixth, etc. tones in the sequence of tones would be selected from a second group of tones in a second band of frequencies separate and distinct from the first band of frequencies. Preferably the two bands of frequencies are separated from each other by a substantial frequency gap. In an illustrative example of a typical system providing ten tones in each group of tones, the first group of tones would have the following frequencies providing 10 different channels: 1177, 1219, 1261, 1306, 1352, 1400, 1449, 1500, 1553 and 1608; while the second group of tones would have the following frequencies providing 10 different channels: 1980, 2049, 2121, 2196, 2274 2354, 2437, 2523, 2612 and 2704. It will be noted that each tone is spaced from the adjacent tones in an amount equal to approximately 3 ⅓% of the frequency thereof, while there are five tones missing between the two groups of tones, thus constituting the frequency gap between the nearest adjacent tones in the two groups of tones. In a typical illustration, the odd numbered tones in the sequence of tones would be selected from the first group of frequencies, while the even numbered tones in the sequence of tones would be selected from the second group of frequencies. Selecting one tone from each group of tones to provide a two-tone sequence permits 100 different codes, while choosing four tones from one group of tones and three tones from the other group of tones to provide seven tones can provide 10,000,000 different codes. If the frequency groups are reversed in sequence an additional 100, or 10,000,000 codes can similarly be provided for 227 tone sequences. Each tone may, for example, have a time duration of 15 to 100 milliseconds, a typical time duration being 30 milliseconds, for a seven tone sequence or 75 milliseconds for a two tone sequence, while the time gap between adjacent tones in the sequence should be as short as possible; as a consequence, for a 7 tone sequence, response times as low as 100 milliseconds are available, all while providing greater security against false activation, as will be explained more fully hereinafter. Further details of the carrier wave and the equipment for producing it may be obtained by referring to U.S. Pat. No. 3,597,690.

The modulated carrier signal is picked up on the antenna 101 and is conveyed by the conductor 102 to the input of a radio frequency amplifier 103. The output of the radio frequency amplifier 103 is supplied by a conductor 104 as one of the inputs to the mixer 105, the usual local oscillator 106 being provided and having the output thereof connected by a conductor 107 as a second input to the mixer 105. The intermediate frequency which is the output of the mixer 105 is applied by a conductor 108 as the input to the IF amplifier 109, the output of which is transmitted by the conductor 110 to the input of a limiter 111. The output of the limiter 111 appears on a conductor 112 and is the input to the discriminator 113, the output of the discriminator 113 being an audio frequency signal appearing on the conductor 114. The audio signal on the conductor 114 is amplified by an audio amplifier 115 and is then conveyed by a conductor 116 to an audio output amplifier 117. The output from the amplifier 117 is applied to an output transformer 120, and specifically to the primary winding 121 thereof, a secondary winding 122 being provided having one terminal connected by a conductor 123 to one of the input terminals of a loud speaker 125, and the other terminal being connected to a conductor 124. The conductors 123 and 124 are also connected as an input to the limiter 150 which provides a signal for a first tone control circuit 200 and a second tone control circuit 300. Before there is any output derived from the loud speaker 125, the tone control circuits 20–300 must be activated by a proper sequence of control tones, the output then being applied to a control relay 130 including a coil 131 to which are connected the conductors 134 and 139, respectively. The armature of the relay 130 controls a movable switch contact 132 which cooperates with a fixed switch contact 133 connected to the conductor 124. A conductor 126 interconnects the other input terminal of the loud speaker 125 and the switch contact 132. A proper output from the tone control circuits 200–300 operates the relay 130 to close the contacts 132–133 thereby to connect the loud speaker 125 across the output terminals of the transformer secondary winding 122, thus to provide an audio output from the receiver 100.

The first tone control circuit 200 has as an input thereto a first control tone as the output of the limiter 150 that appears on the conductor 165, the input being a series of pulses of essentially square wave form that are applied as an input to a tapped filter 201, the output of the tapped filter 201 being a sinusoidal wave form appearing on a conductor 209, provided that the frequency of the input pulse is that to which the tapped filter 201 is tuned. The conductor 209 connects to a rectifier 220 which serves to rectify the input and to provide a D.C. output voltage on a conductor 227 that is connected as one input to a Schmidt trigger circuit 230. Another input to the Schmidt trigger 230 is a suitable bias from a D.C. voltage that is applied on a conductor 155. The output of the Schmidt trigger 230 is connected by a conductor 244 to a delay circuit 260, and if the D.C. voltage on the conductor 244 persists for a predetermined period of time, an output is derived from the delay circuit 260 upon cessation of the first control tone. The output of the circuit 260 appears on a conductor 262 that is connected to the input of the monostable multivibrator 270. The multivibrator 270 is effective to produce an output pulse on a conductor 296 which is applied as one of the inputs to the second tone control circuit 300.

The second tone control circuit 300 has as one of the inputs thereto a second control tone as the output of the limiter 150 that appears on the conductor 165, this input being a series of pulses of essentially square wave form that are applied as an input to a tapped filter 301, the output of the tapped filter 301 being a sinusoidal wave form appearing on a conductor 309, provided that the frequency of the input pulses is that to which the tapped filter 301 is tuned. The conductor 309 connects to a rectifier 320 which serves to rectify the input and to provide a D.C. voltage on a conductor 327 that is connected as one input to a Schmidt trigger circuit 330. Another input to the Schmidt trigger circuit 330 is the pulse on the conductor 296 from the monostable multivibrator 270 described above. The output of the Schmidt trigger 330 is connected by a conductor 344 to a delay circuit 360, and if the control voltage on the conductor 344 persists for a predetermined period of time, an output is derived from the delay circuit 360 on a conductor 366 that is connected as the input to the control circuits 370 that is sufficient to control 370. The output of the control circuits 370 appears on the conductors 134 and 139 that apply an energizing potential to the relay 130 to connect the loud speaker 125 to the audio output of the receiver 100 after the proper sequence of tones has been received. There further is provided a holding circuit 335 that has the input connected to the conductor 344 and has the output connected by a conductor 298 as one of the inputs to the monostable multivibrator 270.

Figure 2:
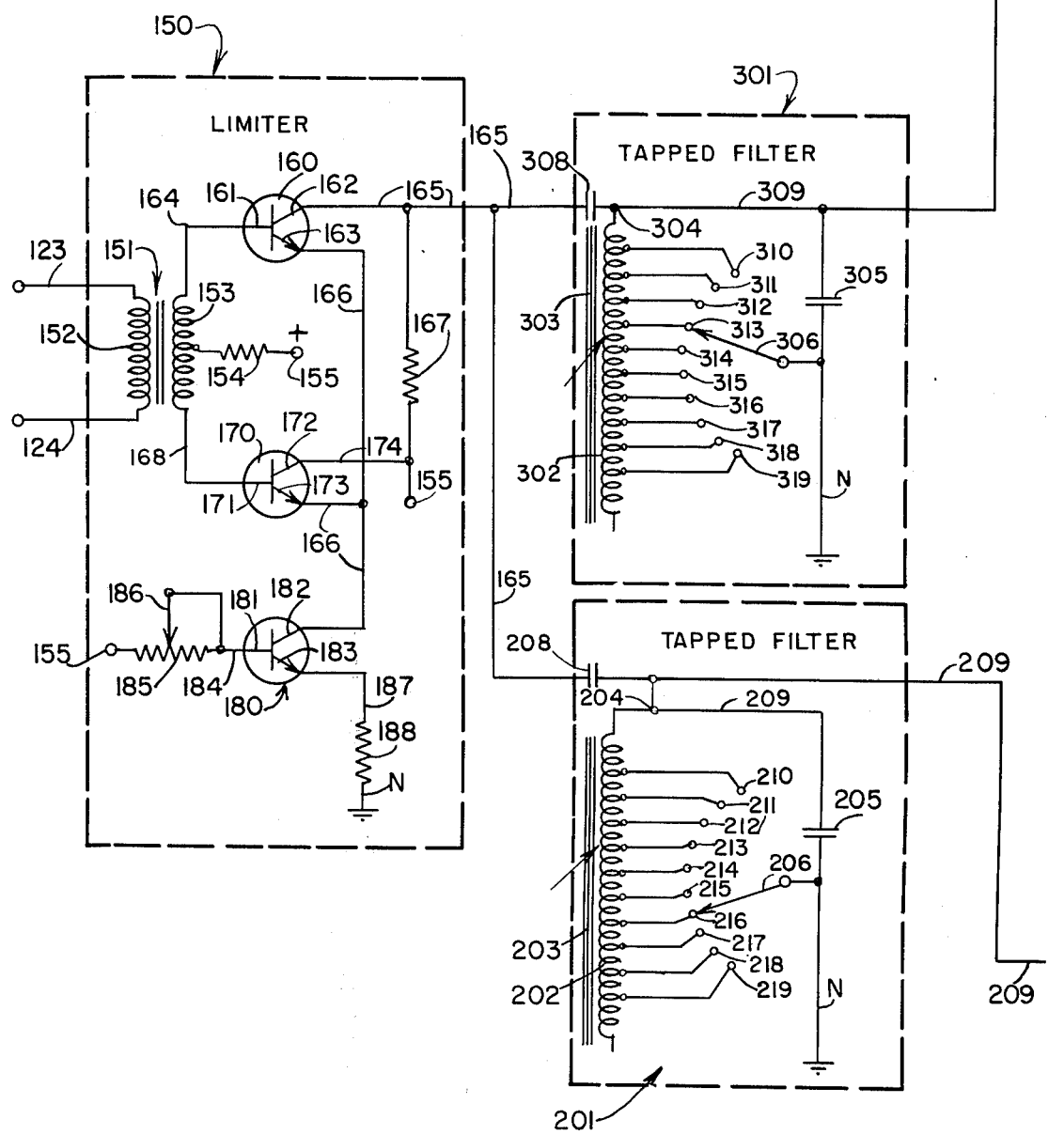
FIG. 2 is a schematic electrical diagram of the tone control circuits forming a part of the receiver of FIG. 1.

Referring to FIG. 2 of the drawings, there is illustrated in detail a portion of the tone control circuits, and specifically the limiter 150 and the two tapped filters 201 and 301. The output from the audio output amplifier 117 is coupled via the output transformer 120 and the conductors 123–124 to the input of the limiter 150, and specifically to the input terminals of a transformer 151. More specifically the transformer 151 has a primary winding 152 and a secondary winding 153, the terminal of the primary winding 152 being connected respectively to the conductors 123–124. The secondary winding 153 is center-tapped and has connected to the center-tap one terminal of a limiting resistor 154, the other terminal of the resistor 154 being connected to the conductor 155. It will be understood that the +D.C. source circuit of which the conductor 155 is the output terminal provides a fixed D.C. voltage of for example 12 volts positive, the value of the voltage being regulated to a stable value as by a Zener diode, for example.

The upper terminal of the secondary winding 153 is connected as an input to a transistor 160, and particularly to the base 161 thereof, the collector 162 being connected as an output to a conductor 165 and through a resistor 167 to the +12 volt D.C. conductor 155; and the emitter 163 is connected to a conductor 166. The lower terminal of the secondary winding 153 is connected by a conductor 168 has an input to a second transistor 170, and specifically to the base 171 thereof. The collector 172 is connected by a conductor 174 to the +12 volt D.C. conductor 155, while the emitter 173 is connected to the conductor 166. There also is provided in the limiter 150 a bias circuit in the form of a transistor 180, the base 181 of the transistor 180 being connected by a conductor 184 to one terminal of a potentiometer 185, the other terminal of the potentiometer 185 being connected to the +12 volt conductor 155, the potentiometer being provided with the usual arm 186 having one end connected to the conductor 184 and the other end contacting an adjusted point on the resistive member of the potentiometer 185. The collector 182 is connected to the conductor 166, while the emitter 183 is connected by a conductor 187 to one terminal of a resistor 188, the other terminal of the resistor 188 being grounded as at N.

The output from the limiter 150 is a train of essentially square waves appearing on the conductor 165, the train of square waves being coupled to the filters 201 and 301 by the conductor 165.

Considering now the construction of the tapped filter 201, there is provided an input capacitor 208 and an inductor in the form of a coil 202 having associated therewith a magnetic core 203, at least a portion of the core 203 being movable and adjustable, whereby the inductor 202 can be slug tuned. The inductor 202 has an input terminal 204 that is connected by a conductor 209 to one terminal of a capacitor 205, the other terminal of the capacitor 205 being grounded as at N, the output being on the conductor 209. As illustrated, the inductor 202 has a plurality of taps thereon, and specifically 10 taps that are connected to contacts numbered 210 through 219. Associated with the contacts is a movable contact arm 206 which is also grounded via the conductor N. The series resonance impedance of the filter 201 can be readily changed by moving the contact arm 206 from one contact to another, whereby to change the frequency at which the parallel circuit consisting of the tapped coil 202 and the capacitor 205 becomes series resonant with the capacitor 208. At resonance the output from the filter 201 will be a maximum and the output will be sinusoidal.

The construction of the tapped filter 301 is identical to that of the tapped filter 201, whereby like reference numerals in the 300 series have been applied to like parts thereof, and in the interest of brevity, no further description of the tapped filter 301 will be given, except to point out that the output therefrom is a sinusoidal wave on the conductor 309, and that the output will be a maximum when the audio input pulse rate is at the frequency to which the output filter 301 is tuned. Further details of the construction of the remainder of the tone control circuits 200 and 300 may be obtained by referring to the above-cited parent patent.

Considering now the operation of the receiver 100, in order to obtain an output from the loud speaker 125, a two-tone sequence of control tones must be applied to the receiver 100, each tone preferably having a time duration of at least about 15 milliseconds without any gap therebetween. Furthermore, the first tone received must be that to which the tapped filter 201 is tuned, and the second tone received must be that to which the tapped filter 301 is tuned. Upon the reception of the first tone, an audio signal corresponding to the first tone is applied along the conductors 123-124 as an input to the limiter 150. The transistors 160-170 provide in essence a differential amplifier, the total current that can flow through the transistors 160-170 being that which flows through the transistor 180 which is in turn controlled by the setting of the potentiometer 185. The potentiometer 185 is adjusted so that the current through the transistor 180 is not sufficient to allow one of the transistor 160-170 to be driven to saturation when the other is non-conducting. The incoming control tone on the conductors 123-124 alternately increases the conduction of one of the transistors 160-170 and decreases to cut-off the conduction of the other, the conduction through the conducting transistor 160-170 being limited by the conduction through the transistor 180. Therefore the output on the conductor 165 is a square wave whenever the amplitude of the incoming audio signal is more than a certain minimum determined by the gain of the limiter 150 and the adjustment of limiting level by the potentiometer 175. Assuming that the amplitude of the first control tone appearing at the input of the limiter 150 is sufficient to cause limiting a square wave output is provided on the conductor 165. It is pointed out that once the limiter 150 operates, the filter control band width will be constant if the limiter is symmetrical, i.e., if the circuits for the transistors 160 and 170 are balanced and symmetrical. An important feature of the limiter 150 resides in the fact that with a carefully controlled D.C. bias potential on the conductor 155 such as that provided by a Zener diode supply, there is no change of the band width as a result of a change in the amplitude of the incoming tone control signal, since above limiting, the voltage level to the output tone filters will be constant. When the amplitude of the incoming signal is below the limiting level, the band width will narrow; however this narrowing portion will be very small. By adjusting the limiting level of the limiting amplifier 150 by means of the slider 186, the maximum band width can be readily adjusted.

The series of square wave pulses on the conductor 165 are then supplied to the tapped filters 201 and 301 and assuming that the contact 206 is positioned so as to be at resonance for the first tone voltage, the output at the conductor 209 will be a sinusoidal wave having a frequency equal to that of the first control tone. It is pointed out that the tapped filter 201 responds to the selected one of the ten tones in the first group of tones that are all disposed in a first band of frequencies extending from 1,177 cycles per seconds to 1,608 cycles per second, while the tapped filter 301 responds to the elected one of the ten tones in the second group of tones that are disposed in a second band of frequencies extending from 1,980 cycles per second to 2,704 cycles per second. It is further pointed out that when the band width for a single tone is adjusted as a percentage of its resonant frequency by slug tuning of the inductors 202 or 302, as the case may be, the percentage of band width remains constant for all other taps. This results from the fact that the frequency of an LC circuit varies directly with the number of turns on the coil and because the Q also varies in a fashion such as to hold the band width as a constant percentage of the particular frequency selected. This results in substantial savings in manufacturing costs since a single frequency or band width adjustment adjusts the band width for all frequencies. Stating the matter in another way, in the resonant circuit such as the tapped filter 201, when the capacitance of the capacitors 208 and 205 are held constant and the inductance of the inductor 202 is varied, by the tap selection, the Q varies proportionately to the number of effective turns used in the inductor 202, the resonant frequency varies inversely as the number of effective turns in the inductor 202, and the Q varies proportionately to the frequency. If the resonant frequency is varied by changing the number of effective turns on the inductor 202, the circuit Q will remain constant at resonance for each selected frequency i.e., if the turns are doubled, the resonant frequency will be halved while the Q will be doubled by the turns increase at the same frequency but halved by the frequency change, thereby to leave the Q unchanged. The voltage as a percentage of the peak voltage gives a band width which is a predetermined percentage of the resonant frequency for any given Q. If Q is held constant, as explained above, the band width will remain a constant percentage of the resonant frequency as the resonant frequency is varied, for example +2% preferred channel separation is that wherein the spacing between adjacent frequencies is a uniform percentage of resonance, the 3⅓% spacing, for example referred to previously.

The sinusoidal wave corresponding in frequency to the first control tone is applied along the conductor 209 as the input to the rectifier 220, and there appears as the output from the rectifier 220 a positive going voltage on the conductor 227 that is applied as an input to the Schmidt trigger circuit 230. The resulting output from the Schmidt trigger renders the monostable multivibrator 270 operative to produce a voltage on the conductor 296 for application to the Schmidt trigger 330 so as to render the second tone control circuit 300 operative, all as previously explained.

Assuming now that a proper second control tone is applied to the receiver 100 and passes through the limiter 150 and the tapped filter 301, there is provided on the conductor 309 a sinusoidal wave form having the frequency of the second control tone. This input is applied to the rectifier 320 thereby to produce a positive going output on the conductor 327 that is applied to the Schmidt trigger circuit 330. This causes a potential to appear on the conductor 366 which renders operative the control circuits 370, all as previously explained.

It is further pointed out that upon receiving the second control tone so as to provide the negative going voltage on the conductor 344, a pulse is transmitted via the holding circuit 395 and the conductor 298 to the monostable multivibrator 270 to hold the multivibrator 270 in a cndition such that the Schmidt trigger circuit 330 will continue to be held in a condition to transmit the signals generated by the second control tone. In this manner it will be appreciated that the Schmidt trigger 330 also serves as an "AND" circuit wherein the output from the first tone control circuit 200 must be applied thereto before the application of the second control tone output from the rectifier 320 is effective.

Further the feedback of the HOLD ON voltage permits the second tone to continue for as long as desired, so long as it appears soon enough after the first tone period to cause the hold on voltage to be generated, thereby controlling the multivibrator 270 in the "on" condition. The multivibrator 270 may, for example, be on for only 15 or 20 milliseconds in the absence of a HOLD ON voltage. During this period, control tone two must be applied, and the filter output must rise to a voltage sufficient to produce the HOLD ON voltage.

An important feature of the tone control circuit of the receiver 100 resides in the freedom from falsing, i.e., the freedom from operation by false and spurious signals that may be applied as an input thereto. The freedom from falsing results from several factors. First, by utilizing the tone filter circuitry (including the limiter 150, the tapped filters 201-301, the rectifiers 320-330) having the characteristics as described; there positively can be no response to signals that lie out of the filter band pass, regardless of the false signal duration or intensity. Second, by requiring that subsequent tones in a tone sequence be spaced apart in frequency by several tone channels, together with requiring substantially instantaneous switching between successive tones, a signal of smoothly varying pitch such as might be produced by a heterodyne circuit, a siren near a microphone or like source, cannot actuate the tone control circuits, this resulting from the fact that the tone control circuits require a sudden jump or change in frequency between successive tones.

It is further pointed out that the described tone control circuit is readily adaptable to and compatible with a decimal numbering system, at ten different frequencies in each group of tones corresponding to and representing the ten different digits, with successive tones being selected alternately from the two groups of tones. If only ten frequencies were utilized (rather than the twenty frequencies of the present system), to represent the 10 digits, i.e., with no change or jumping between bands of frequencies on successive digits, it would not be possible to utilize codes such as 22, 55, etc. in two tone sequence systems. Although it has been suggested that an eleventh tone be utilized as a repeat tones in such sequence, the frequency spectrum utilized if five channels are to separate adjacent tones would be substantially greater than that required for the present system, and the circuitry would be substantially more complicated. It is pointed out that utilizing this present system wherein alternate tones are selected from two groups of tones wherein the groups are separate at a minumum gap of five tones, only a 25 channel spectrum is required to produce any pair of digits in sequence while still maintaining a minimum gap of five channels therebetween.

Figure 3:
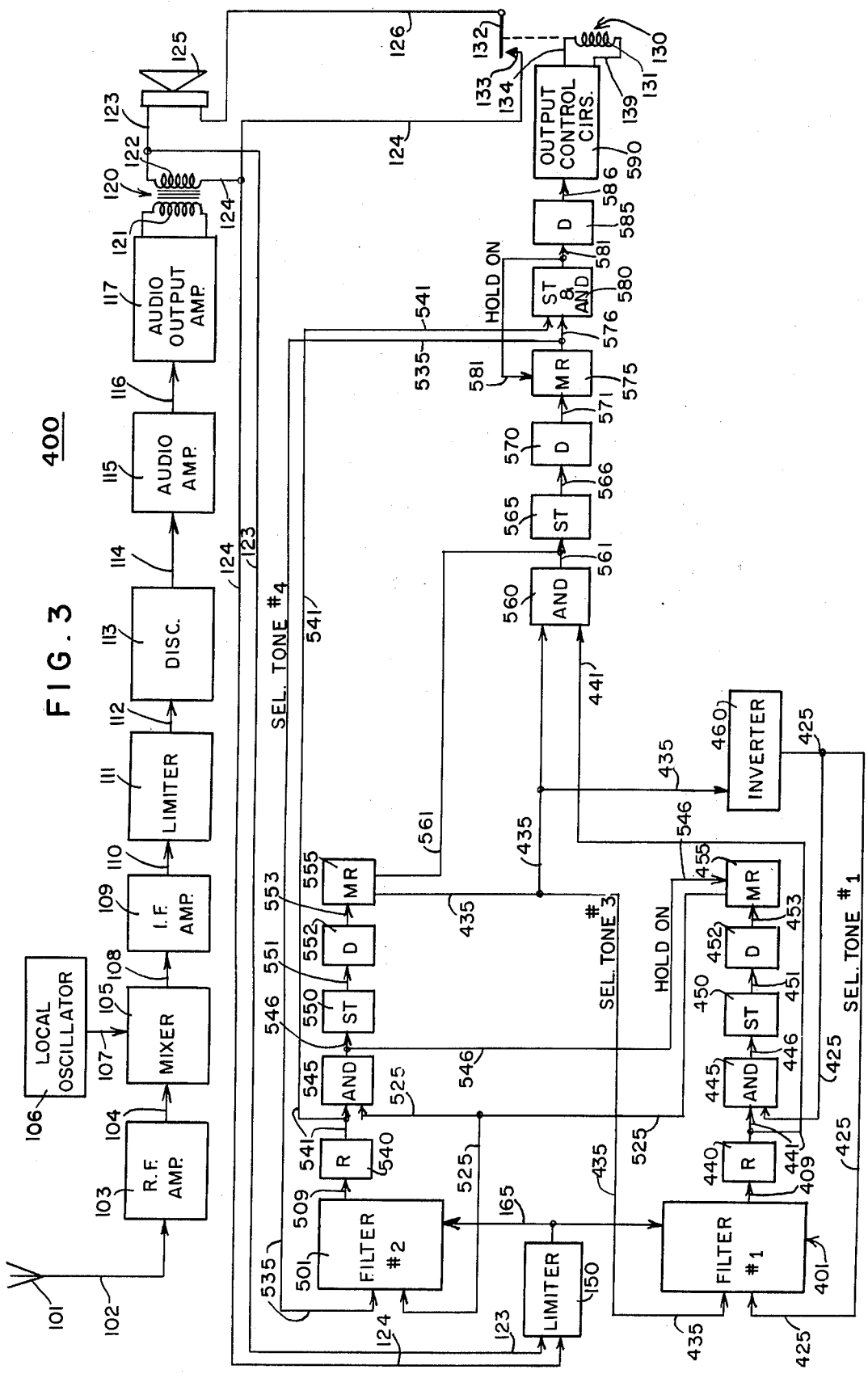
FIG. 3 is a schematic and block diagram of a second form of a receiver including tapped filters made in accordance with and embodying the principles of the present invention.

Referring now to FIG. 3 of the drawings, there is illustrated a second embodiment of the present invention wherein a sequence of four tones is required to actuate the receiver, the receiver being designated by the numeral 400 and being illustrated in schematic and block diagram form. The receiver 400 utilizes the input circuits and components from the antenna 101 through the limiter 150 and onto the conductor 165, from the receiver 100, whereby the same reference numerals have been applied to these components and the description thereof will not be here repeated in the interest of brevity.

The output of the limiter 150 on the conductor 165 is fed to two tone control circuits, the lower tone control circuit including a special tapped filter 401 identified by the legend "FILTER No. 1" of a construction to be described hereinafter, the input to the filter 401 being a series of square waves and the output thereof appearing on a conductor 409 in the form of a sinusoidal wave having a frequency of the selected control tone. The conductor 409 connects to a rectifier 440 which serves to rectify the input thereto and which has the same construction as the rectifier 220 described above. The output from the rectifier 440 is a positive voltage that is supplied along a conductor 441 as one of the inputs to an AND circuit 445. The output from the AND circuit 445 appears on a conductor 446 that is connected to the input of a Schmidt trigger circuit 450, the AND circuit 445 and the Schmidt trigger circuit 450 having the construction of the Schmidt trigger circuit 330 described above. The output from the Schmidt trigger circuit 450 is connected by a conductor 451 to a delay circuit 452 of the same construction as the delay circuit 260, and the output from the delay circuit 452 is connected by a conductor 453 as one input to a monstable multivibrator 455 of the construction described above with respect to the monostable multivibrator 270. The output from the multivibrator 455 appears on a conductor 525 that connects into the upper tone control channel. Also associated with the lower tone control channel is an inverter 460 having an input thereto from a conductor 435 and having an output on a conductor 425 that connects as an input to the filter 401, and to provide the second input to the AND circuit 445.

The upper tone control channel includes a special tapped filter 501 identified as FILTER No. 2 also to be described more fully hereinafter, one of the inputs to the filter 501 being from the conductor 525 and another being from the conductor 165. The output from the filter 501 appears on a conductor 509 connected to a rectifier 540 of the same construction as the rectifier 320 described above. The output from the rectifier 540 is on a conductor 541 that supplies one input to an AND circuit 545, the output of which appears on a conductor 546 connected as an input to a Schmidt trigger circuit 550; the AND circuit 545 and the Schmidt trigger circuit 550 together having the construction of the Schmidt trigger circuit 330 described above. The output from the Schmidt trigger circuit 550 appears on a conductor 551 and is supplied as an input to a delay circuit 552 having the construction of the delay circuit 260 described above. The output from the delay circuit 550 appears on a conductor 553 and is an input to a monostable multivibrator 555 having a construction like the monostable multivibrator 270.

The outputs on the conductors 435 and 441 are applied as inputs to an AND circuit 560, the output from the AND circuit 560 being on the conductor 561 that is connected to a Schmidt trigger circuit 565 of the construction of the Schmidt trigger circuit 330 described above. The conductor 561 also connects to the monostable multivibrator 555, and the conductor 475 also connects to the Schmidt trigger circuit 565. The output from the Schmidt trigger circuit 565 appears on the conductor 566 and is applied to a delay circuit 570 having the construction of the delay circuit 260 described above, the output from the delay circuit 570 being on the conductor 571 connected to a monostable multivibrator 575. The monostable multivibrator 575 is of the same construction as the monstable multivibrator 270 and is connected by a conductor 576 to a combination Schmidt trigger and AND circuit 580, of the construction of the circuit 330, the output of which is connected to a delay circuit 585 of the construction of the delay circuit 260, the output of the delay circuit 585 being on a conductor 586 connected to an output control circuit 590 having the same construction and arrangement as the control circuits 370 described above. The conductor 576 also connects via a conductor 535 as an input to the filter 501, the conductor 541 is also connected as an input to the AND circuit 580 and the HOLD ON circuit is provided interconnecting the conductor 581 and a monostable multivibrator 575.

Figure 4:
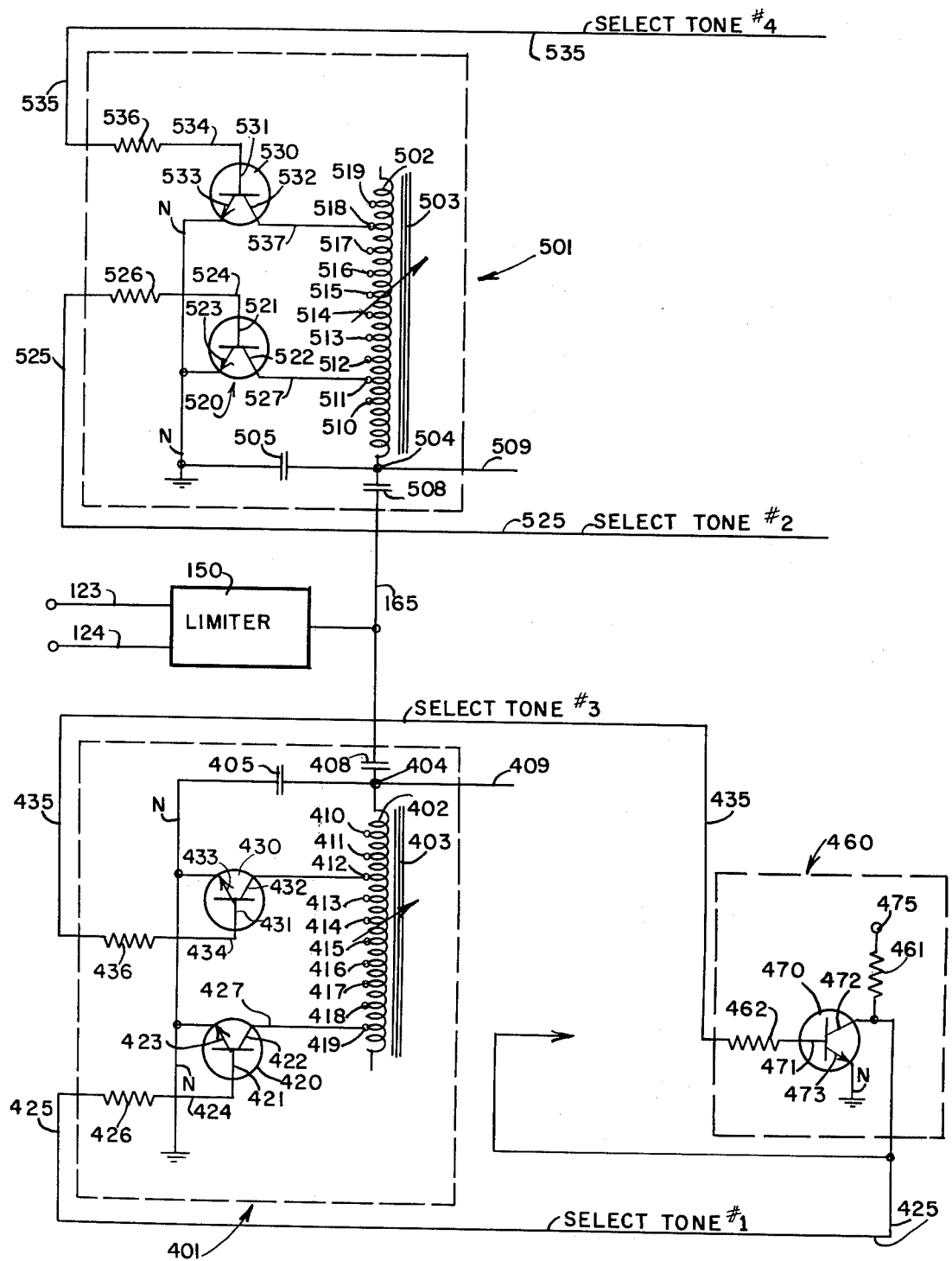
FIG. 4 is a schematic electrical diagram of the filters and inverter forming a part of the receiver illustrated in FIG. 3.

Referring now to FIG. 4 of the drawings, there are illustrated the further details of the filters 401 and 501 and the inverter 460. As illustrated, the filter 401 includes an inductor in the form of a coil 402 having associated therewith a magnetic core 403, at least a portion of the core 403 being movable and adjustable, whereby the inductor 402 can be slug tuned. The inductor 402 has an input terminal 404 that is connected by a conductor 409 to one terminal of a capacitor 405, and through a capacitor 408 to the conductor 165, the other terminal of the capacitor 405 being grounded as at N, the output from the filter 401 appearing on the conductor 409. The inductor 402 has a plurality of taps thereon, and specifically 10 taps that are identified by the numerals 410 through 419. Associated with selected ones of the taps are two transistors 420 and 430. More specifically, the transistor 420 has a base 421 that is connected to one terminal of a resistor 426 by means of a conductor 404, the other terminal of the resistor 426 being connected to the conductor 425. The transistor 420 has a collector 422 that is connected to the tap 419 on the inductor 402, while the emitter 423 is connected to ground potential.

The transistor 430 has a base 431 that is connected to one terminal of a resistor 436, the other terminal of the resistor 436 being connected to the conductor 435. The transistor 430 has a collector 432 that is connected to the tap 412 on the inductor 402, while the emitter 433 is connected to ground potential.

The tapped filter 501 includes an inductor in the form of a coil 502 having associated therewith a magnetic core 503, at least a portion of the core 503 being movable and adjustable whereby the inductor 502 can be slug tuned. The inductor 502 has an input terminal 504 that is connected by a conductor 509 to one terminal 504 that is connected by a conductor 509 to one terminal of a capacitor 505 and through a capacitor 508 to the conductor 165, the other terminal of the capacitor 505 being grounded as at N, the output from the filter 501 appearing on the conductor 509. The inductor 502 has a plurality of taps thereon, and specifically 10 taps that are identified by the numerals 510 through 519. Associated with the selected ones of the taps are two transistors 520 and 530. More specifically, the transistor 520 has a base 521 that is connected by a conductor 524 to one terminal of a resistor 526, the other terminal of the resistor 526 being connected to the conductor 525. The transistor 520 has a collector 522 that is connected to the tap 511 on the inductor 502, while the emitter 523 is connected to ground potential.

The transistor 530 has a base 531 that is connected to one terminal of the resistor 536, the other terminal of the resistor 536 being connected to the conductor 535. The transistor 530 has a collector 532 that is connected to the tap 518 on the inductor 502, while the emitter 533 is connected to ground potential.

Associated with the tone control circuits is the inverter 460 that is also illustrated in detail in FIG. 4, the inverter being in the form of a transistor 470 having a base 471 connected through a resistor 562 to the conductor 435. The transistor 470 further has its emitter 473 grounded and the collector 472 is connected to the conductor 425 and through a resistor 461 to the +D.C. conductor 155.

Considering now the operation of the receiver 400, in order to obtain an output from the loud speaker 125, a four tone sequence of the proper selected control tones must be applied to the receiver 400, each tone preferably having a time duration of at least about 40 milliseconds and adjacent tones having substantially no gaps therebetween. Furthermore, the first and third tones received must be those to which the filter 401 is tuned when the transistors 420 and 430, respectively, are conducting, and the second and fourth tones received must be those to which the filter 501 is tuned when the transistors 520 and 530, respectively, are conducting. Upon the reception of the first tone, an audio signal corresponding to the first tone is applied along the conductors 123–124 as an input to the limiter 150, and there appears on the conductor 165 a series of square wave forms. The transistor 470 in the inverter 460 is off at this time so as to allow the transistor 420 to be conducting and thus to tune the filter 401 for reception of the first control tone. Accordingly, the output on the conductor 165 is developed across the resonance circuit and the output of filter 401 as a sinusoidal wave form appears on the conductor 409. The sinusoidal wave form on the conductor 409 is rectified by the rectifier 440 and is applied as one of the positive inputs to the AND circuit 445, the other required positive input being applied along the conductor 425.

The output of the AND circuit 445 is a positive voltage which triggers the Schmidt trigger 450, thus to cause a negative going voltage to be applied along the conductor 451 to the delay circuit 452 which after a predetermined time interval cause a trigger pulse to be applied on removal of tone to the monostable multivibrator 455. Upon the removal of the first tone from the receiver 400, a positive output is derived from the multivibrator 455 that is applied along the conductor 525 to select the second tone in the filter 501 by rendering the transistor 520 conductive in the filter 501 and also to provide one of the necessary positive inputs to the AND circuit 545.

Assuming that the second control tone in the sequence is now received, the filter 501 is resonant to the input frequency and thereby develops a sinusoidal wave form at conductor 509 of the second control tone frequency thereon which is applied to the rectifier 540. The output from the rectifier 540 is a positive voltage that provides the second required positive input to the AND circuit 545, thereby to cause an output therefrom that is applied to the Schmidt trigger circuit 550. The output from the AND circuit 545 is fed back along the conductor 546 to the multivibrator 455 to hold it in the active condition for the duration of the second tone, regardless of the time duration of the second tone. The output from the AND circuit 545 also trips the Schmidt trigger circuit 550 and the output is applied to the delay circuit 552, whereby if the output from the Schmidt trigger circuit persists for the predetermined delay period, the multivibrator 555 will provide an output on the interruption of the second control tone. The output of the multivibrator 555 is applied along the conductor 435 to select the proper tone No. 3 in the filter 401 by rendering the transistor 430 conductive, and the output for the multivibrator 555 is also applied along the conductor 435 as a positive input to the AND circuit 560 and to the inverter 460. The inverter 460 now conducts so as to cause the transistor 420 to cease conduction and thus effectively to remove the connection thereof in the filter 401, and at the same time positive voltage is removed from the conductor 425 to the AND circuit 445 preventing it from operating.

If the proper third control tone is now received on the conductor 165, the filter 401 will pass the third control tone to the rectifier 440 which will now apply the third control tone as a positive input to the AND circuit 445 (there being no output from circuit 445 since there is now no input on conductor 425) and also to provide a second input to the AND circuit 560, whereby a potential is applied along the conductor 561 to the multivibrator 555 to hold it in the active condition so long as the third tone is received.

Output of the AND circuit 560 is also applied to the Schmidt trigger circuit 565, the output of which is supplied along the conductor 566 through the delay circuit 570 and the conductor 571 to the multivibrator 575. Provided that the third tone persists for a time inverval, determined by the delay circuit 570, upon the release or removal of the third tone, the multivibrator 575 causes an output pulse to appear on the output conductor 576 which is fed back to select the proper filter for tone No. 4 along the conductor 535, and this signal is also applied as one of the positive inputs to the AND circuit 580.

Assuming that the proper fourth tone in the sequence of tones is now received, there will be an output from the filter 501 and the rectifier 540 which is applied along the conductor 541 as a second positive input to the AND circuit 580, thereby to provide an output therefrom that is fed via the conductor 581, the delay circuit 585 and the conductor 586 to the output control circuits 590, whereby the circuits 590 are energized if the time duration of the fourth tone is longer than the delay provided by the delay circuit 585. It is noted that a HOLD ON potential is applied from the output of the AND circuit 580 along the conductor 581 to the multivibrator 575 to hold it in the active condition so long as the fourth tone is received. The output signal on the conductor 586 is operative to cause operation of the circuits 590 in the same manner as the control circuits 370 described above, thereby to energize the relay 130 and to connect the loud speaker 125 to the output of the transformer 120.

It is further pointed out that in the receiver 100 of FIG. 1 a fixed bias has been applied to the first Schmidt trigger circuit, which circuit is designed that a full output is obtained therefrom whenever the fixed voltage bias is exceeded. If the fixed voltage bias is not exceeded, the circuit is completely inoperative. The limiter 150 provides a square wave as an input to the filters, which square wave is of constant amplitude, whereby there is a constant output voltage from the filters for any given tone frequency. These features provide frequency band width for the limited signal, i.e., the upper and lower frequency that will trip the Schmidt trigger circuit is predetermined by the inter-relationship between the filter curve, the limiting level, and the D.C. bias level. As explained above, the limiting or bias level can be varied to alter the response band width. On all other Schmidt triggers the bias is supplied by the monostable multivibrator feeding its AND input when it is triggered to the on condition.

Figure 5:
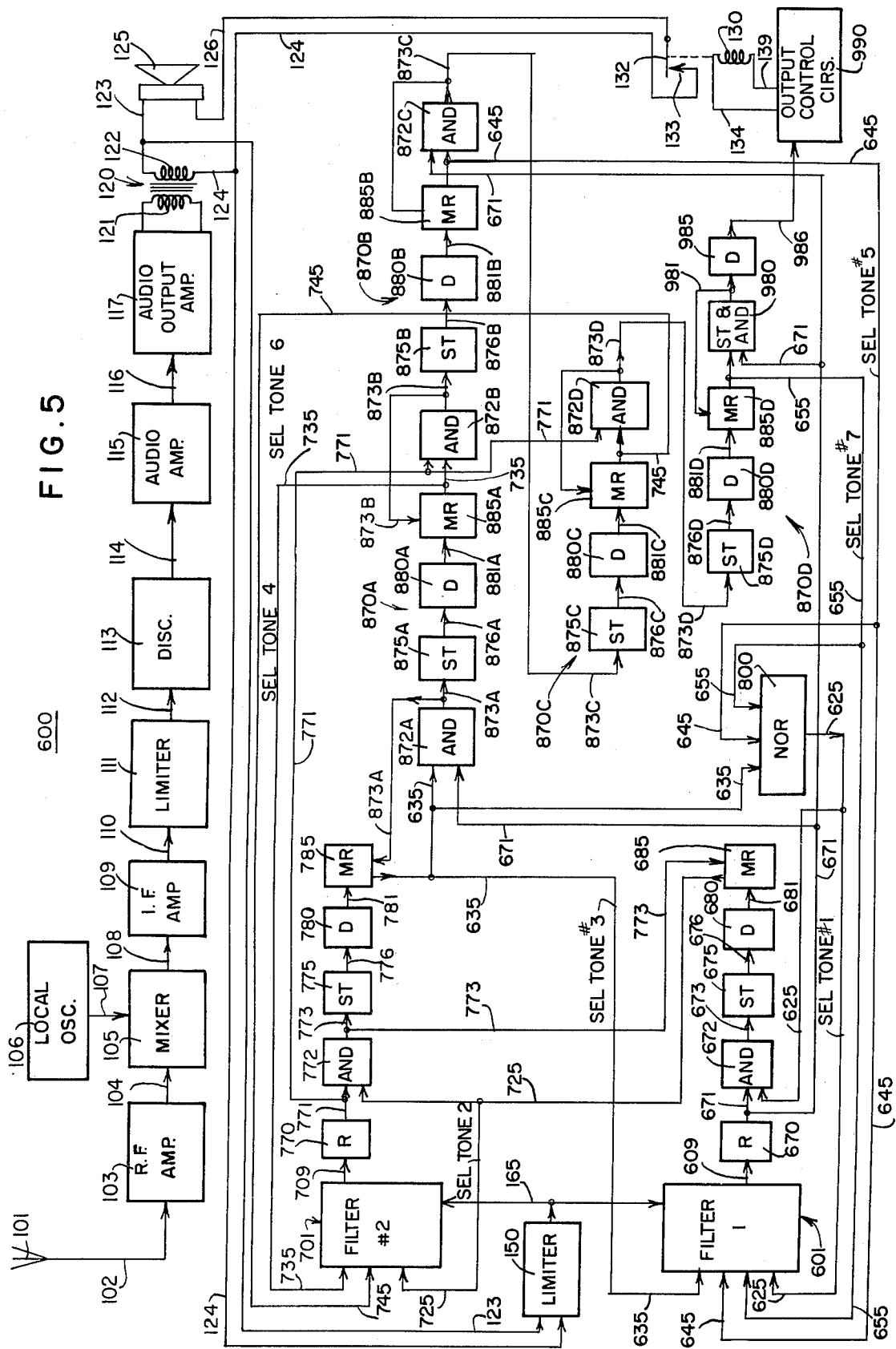
FIG. 5 is a schematic and block diagram of a third form of a receiver including filter devices made in accordance with and embodying the principles of the present invention.
Figure 6:
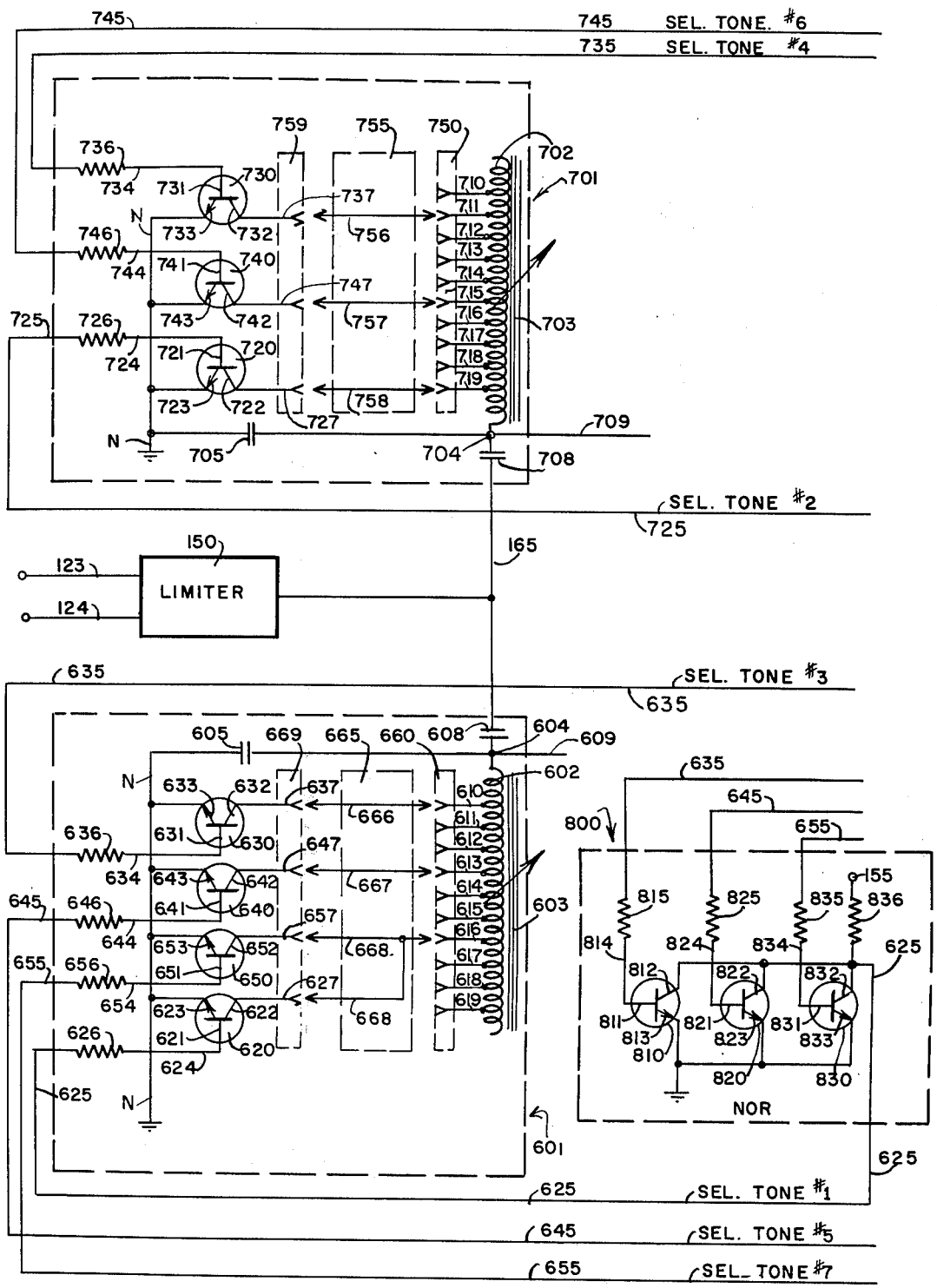
FIG. 6 is a schematic electrical diagram of the filters and the NOR circuit forming a part of the receiver of FIG. 5.

Referring now to FIGS. 5 and 6 of the drawings, there is illustrated a third embodiment of the present invention wherein a sequence of 7 tones is required to actuate the receiver, the receiver being designated by the numeral 600 and being illustrated in schematic and block diagram form in FIG. 5. The receiver 600 utilizes the input circuits and components from the antenna 101 through the limiter 150 and onto the conductor 165 from the receiver 100, whereby the same reference numerals have been applied to these components and the description thereof will not be here repeated in the interest of brevity.

The output of the limiter 150 on the conductor 165 is fed to two tone control circuits, the lower tone control circuit including a special tapped filter 601 identified by the legend FILTER No. 1 of a construction to be described hereinafter, the input to the filter 601 being a series of square waves and the output thereof appearing on a conductor 609 in the form of a sinusoidal wave having the frequency of the selected control tone. The conductor 609 connects to a rectifier 670 which serves to rectify the input thereto and which has the same construction as the rectifier 220 above. The output from the rectifier 670 is a positive voltage that is supplied along a conductor 671 as one of the inputs to an AND circuit 672. The output from the AND circuit 672 appears on a conductor 673 that is connected to the input of a Schmidt trigger circuit 675, the AND circuit 672 and the Schmidt trigger circuit 675 together having the construction of the Schmidt trigger circuit 330 described above. The output from the Schmidt trigger circuit 675 is connected by a conductor 676 to a delay circuit 680 of the same construction as the delay circuit 260, and the output from the delay circuit 680 is connected by a conductor 681 as one input to a monostable multivibrator 685 of the construction described above with respect to the monostable multivibrator 270. The output from the multivibrator 675 appears on a conductor 725 that connects into the upper tone control channel.

The upper tone control channel includes a special tapped filter 701 identified as FILTER No. 2, also to be described more fully hereinafter; one of the inputs to the filter being from the conductor 165 and other inputs being from the conductor 725, 735 and 745, to be described more fully hereinafter. The output from the filter 701 appears on the conductor 709 connected to a rectifier 770 of the same construction as the rectifier 320 described above. The output from the rectifier 770 is on a conductor 771 that supplies one input to an AND circuit 772, the output of which appears on a conductor 773 connected as an input to a Schmidt trigger circuit 775; the AND circuit 772 and the Schmidt trigger circuit 775 together having the construction of the Schmidt trigger circuit 330 described above. The output from the Schmidt trigger circuit 775 appears on a conductor 776 and is supplied as an input to a delay circuit 780 having the construction of the delay circuit 260 described above. The output from the Schmidt trigger circuit 775 appears on a conductor 776 and is supplied as an input to a delay circuit 780 having the construction of the delay circuit 260 described above. The output from the delay circuit 780 appears on a conductor 781 and is an input to a monostable multivibrator 775 having a construction like the monostable vibrator 270.

The output from the monostable multivibrator 785 appears on a conductor 635 and is applied as an input to the filter 601 and as an input to a NOR circuit 800. Other inputs to the NOR circuit 800 are applied by the conductors 645 and 655, while the output from the NOR circuit 800 appears on the conductor 625.

The outputs on the conductors 635 and 671 are applied as inputs to the first of four tone selecting and responding circuit 870, each of which includes an AND circuit 872, a Schmidt trigger circuit 875, a delay circuit 880 and a monostable multivibrator 885, the AND circuit 872 in combination with the Schmidt trigger circuit 875 having the construction of the Schmidt trigger 330, the delay circuit 880 having the construction of the delay circuit 260 and the monostable multivibrator 885 having the construction of the mulvibrator 270, all described heretofore.

More specifically, the inputs on the conductors 635 and 671 are applied as inputs to such a tone selecting and responding circuit 870A including an AND circuit 872A. The output from the AND circuit 872A appears on a conductor 873A which is connected to the input of a Schmidt trigger circuit 875A, and also as an input to the monostable multivibrator 785. The output from the Schmidt trigger circuit 875A is connected by a conductor 876A to a delay circuit 880A, the output of which is applied along a conductor 881A as an input to a monostable multivibrator 885A. The output of the monostable multivibrator 885A, which is also the output of the tone selecting and responding circuit 870A, is applied along the conductor 735 as a tone selecting signal to the filter 701 and as an input to the next tone selecting and responding circuit 870B.

The tone selecting and responding circuit 870B has the same essential construction and arrangement as the tone selecting and responding circuit 870A, and therefore in the interest of brevity will not here be repeated, it being pointed out that one of the outputs therefrom appears on a conductor 873B which is a HOLD ON circuit for the multivibrator 885A, and the output from the circuit 870B appears on the conductor 645 and is applied as a tone selecting signal to the filter 601 and as the input to the next tone selecting and responding circuit 870C.

The tone selecting and responding circuit 870C likewise has the same essential construction and arrangement as the circuit 870A, and therefore will not be described in detail, except to point out that one of the outputs therefrom is along the conductor 873C to the multivibrator 885B to serve as a HOLD ON signal therefor, and the output from the circuit 870C appears on the conductor 745 and is applied as the signal to the filter 701 to select control tone No. 6.

The output from the circuit 870C is applied also as an input to the circuit 870D which has the same essential construction and arrangement as the circuit 870A, it merely being pointed out that one of the outputs thereof is a HOLD ON signal appearing on the conductor 873D which is applied to the multivibrator 885C, the output of the circuit 870D appearing on the conductor 655 and being applied as a signal to the filter 601 to select the control tone No. 7.

The output of the circuit 870D is also applied as one of inputs to a combination Schmidt trigger and AND circuit 980 of the construction of the circuit 330 described above, the signal on the conductor 671 also being applied thereto. The output from the circuit 980 is applied along a conductor 981 to a delay circuit 985 of the same construction as the delay circuit 260, the output of the circuit 980 also being applied to the multivibrator 885D as a HOLD ON signal therefor. The output of the delay circuit 985 is applied along a conductor 986 to an output control circuit 990 having a same construction and arrangement as the control circuits 370 described above.

Referring now to FIG. 6 of the drawings, there are illustrated the further details of the filter 601 and 701 and of the NOR circuit 800. As illustrated, the filter 601 includes an inductor in the form of a coil 602 having associated therewith a magnetic core 603, at least a portion of the core 603 being movable and adjustable, whereby the inductor 602 can be slug tuned. The inductor 602 has an input terminal 604 that is connected by a conductor 609 to one terminal of a capacitor 605 and through a capacitor 608 to the conductor 165, the other terminal of the capacitor 605 being grounded as at N, the output from the filter 601 appearing on the conductor 609. The inductor 602 has a plurality of taps thereon, and specifically ten taps that are identified by the numerals 610 through 619, each of the taps as illustrated being connected by a suitable conductor to a female terminal in a plug 660. Associated with selected ones of the taps are four transistors 620, 630, 640 and 650. More specifically, the transistor 620 has a base 621 that is connected to one terminal of a resistor 626 by means of a conductor 624, the other terminal of the resistor 626 being connected to the conductor 625. The transistor 620 has a collector 622 which is connected by a conductor 627 to a female terminal in a connector 669. The emitter 623 is connected to ground potential.

The transistors 630, 640 and 650 each have the same construction and arrangement as the transistor 620 whereby the various parts thereof and the circuit elements connected thereto have had applied thereto like reference numerals in the correspondind series of numerals. In order to connect the several collectors to selected ones of the taps on the inductor 602, a connector 665 has been provided having selected connections 666, 667 and 668 which selectively interconnect certain of the female terminals on the connector 660 to selected female terminals on the connector 669. As illustrated, the conductor 666 connects the collector 632 to the tap 610; the conductor 667 connects the connector 662 to the tap 616; and the conductor 668 connects both the collector 622 and the collector 652 to the same tap 616.

The tapped filter 701 includes an inductor in the form of a coil 702 having associated therewith a magnetic core 703, at least a portion of the core 703 being movable and adjustable, whereby the conductor 702 can be slug tuned. The inductor 702 has an input terminal 704 that is connected by a conductor 709 to one terminal of a capacitor 705 and through a capacitor 708 to the conductor 165, the other terminal of the capacitor 705 being grounded as at N, the output from the filter 701 appearing on the conductor 709. The inductor 702 has a plurality of taps thereon, and specifically 10 taps are identified by the numerals 710 through 719, each of the taps being connected to a female terminal in a connector 750. Associated with selected ones of the taps are three transistors 720, 730 and 740. The transistor 720 has a base 721 that is connected by a conductor 724 to one terminal of a resistor 726, the other terminal of the resistor 726 being connected to the conductor 725. The transistor 720 has a collector 722 that is connected by a conductor 727 to a female terminal in a connector 759 and has an emitter 723 connected to ground potential.

The transistors 730 and 740 have the same construction and essentially the same circuit connections as the transistor 720, and accordingly, in the interest of brevity, like reference numerals have been applied to like parts thereof in the appropriate number series. It is pointed out that each of the collectors terminates in a female terminal in the connector 759. In order to connect the several collectors to the required tap on the inductor 702, a connector 755 has been provided having conductors 756, 757 and 758 therein arranged to connect selected ones of the female terminals in the connector 750 and 759. More specifically, the conductor 756 connects the collector 732 to the tap 711; the conductor 757 connects the collector 740 to the tap 715; and the conductor 758 connects the collector 722 to the tap 719.

From the above, it will be seen that by suitable selection of connections within the connectors 665 and 755, any one of the taps on the inductors 602 and 702, respectively, can be connected to any one of the tone selecting transistors associated in the respective filters 601 or 701. In other words, selection of the desired tap is made by a simple wire connection, whereby the selection of the desired tone frequency in a tone sequence is effected entirely by the conductors or jumper wires 666, 667, etc. which connect the two connectors 660–669 and 750–759, respectively. Thus the provision of two tapped coils and the connectors suitably wired as explained above will permit the selection of any one of 20,000,000 tone combinations in a seven digit tone control circuit of the type illustrated by the receiver 600. It will be appreciated that the connection arrangement may be provided in the tapped filters in the receivers 100 and 400, thereby to permit like simple selection of the desired code by means of replacing only the connector such as the connectors 665 and 755 described above.

Associated with the tone control circuits, and useful in selecting the proper tone to be passed by the filters 601 and 701, is the NOR circuit 800, the NOR circuit as illustrated including three transistors 810, 820 and 830. The transistor 810 has a base 811 that is connected by a conductor 814 to one terminal of a resistor 815, the other terminal of the resistor 815 being connected to the conductor 635 which is the third tone selector conductor. The transistor 810 also has a collector 812 connected to the conductor 625 which is the first tone selector conductor, and has an emitter 813 that is grounded as at N. The transistor 820 has a base 821 connected by a conductor 824 to one terminal of the resistor 825, the other terminal of the resistor 825 being connected to the resistor 815 which is the fifth tone selector conductor. The transistor 820 also has a collector 822 connected to the conductor 625 and an emitter 823 connected to ground potential. The transistor 830 has a base 831 connected by a conductor 834 to one terminal of a resistor 835, the other terminal of the resistor 835 being connected to the resistor 655 which is the seventh tone selector conductor. The transistor 830 also has a collector 822 connected to the conductor 625 and an emitter 833 connected to ground potential. It also is pointed out that the conductor 625 is connected by a resistor 836 to the plus 12 volts D.C.

conductor 155.

Considering now the operation of the receiver 600, in order to obtain an output from the loud speaker 125, a seven-tone sequence of the proper selected control tones must be applied to the receiver 600, each tone preferably having a time duration of at least about 25 milliseconds and adjacent tones having substantially no gaps therebetween. Furthermore, the first and third and fifth and seventh tones received must be those to which the filter 601 is tuned when the transistors 620, 630, 640 and 650, respectively, are conducting; and the second and fourth and sixth tones received must be those to which the filter 701 is tuned when the transistors 720, 730 and 740, respectively, are conducting. Upon the reception of the first tone, and audio signal corresponding to the first tone is applied along the conductors 123–124 as an input to the limiter 150, and there appears on the conductor 165 a series of square wave forms. The transistors in the NOR circuit 800 are all non-conducting, whereby a high potential is applied from the conductor 155 via the resistor 836 and the conductor 625 to the base 621 of the transistor 620. As a result, the transistor 620 is conducting thereby to connect the associated tap 619 as the effective tap on the inductor 602 in the filter 601. Assuming that the first control tone is of the proper frequency as selected by the transistor 620, an output is developed on the conductor 609 in a form of a sinusoidal wave of the frequency of the first control tone. The sinusoidal wave on the conductor 609 is rectified by the rectifier 670 and is applied as one of the positive inputs to the AND circuit 672, the other required positive input being applied from the conductor 625 as explained above.

The output of the AND circuit 672 is a positive voltage which triggers the Schmidt trigger circuit 675, thus to cause a negative going voltage to be applied along the conductor 676 to the delay circuit 680, which after a predetermined time interval is in condition such that the cessation of the first control tone causes a trigger pulse to be applied to the monostable multivibrator 685. Upon the removal or cessation of the first tone, positive output is thus derived from the multivibrator 635 that is applied along the conductor 725 to select the second tone in the filter 701 by rendering the transistor 720 conductive, and also to provide one of the necessary positive inputs to the AND circuit 772.

Assuming that the second control tone in the sequence is now received and the filter 701 is resonant thereat, there is developed a sinusoidal wave form on the conductor 709 having a frequency corresponding to that of the second control tone, which output is then applied to the rectifier 770. The output from the rectifier 770 is a positive voltage that is applied along the conductor 771 as the second required input to the AND circuit 772, thereby to provide an output from the AND circuit 772. The output of the AND circuit 772 is applied along the conductor 773 to the multivibrator 685 to hold it in the active condition for the duration of the second tone, regardless of the time duration of the second tone; and the output is also applied to the Schmidt trigger circuit 775 to cause an output therefrom to appear on the conductor 776 that is applied to the delay circuit 780. Assuming that the second control tone persists for a time that exceeds the delay time of the circuit 780, then upon cessation of the second control tone, the multivibrator 785 is triggered to provide an output on the conductor 635. The positive going output on the conductor 635 is applied to the base of the transistor 630 in the filter 601, thus to select the filtering frequency for the third control tone, and the output is also applied as one of the two required inputs to the AND circuit 872A in the tone selecting and responding circuit 370A. Furthermore, the output from the multivibrator 785 is applied to the NOR circuit 800, and specifically to the base of the transistor 810 therein, thus to cause the heavy conduction thereof and to drop the potential on the conductor 625, thereby effectively to remove the transistor 620 by causing the transistor to become non-conductive, thus leaving only the transistor 630 and that portion of the inductor 602 associated therewith as active elements in the filter 601.

The circuit is now in condition for the reception of the third control tone, which if applied at this time and at the proper frequency causes a sinusoidal output of a corresponding frequency on the conductor 609. The sinusoidal wave for the third tone on the conductor 609 is supplied to the rectifier 670 where it is rectified to provide a positive going voltage on the conductor 671. Although the positive going voltage on the conductor 671 is applied to the AND circuit 672, there is no output from the AND circuit 672 at this time because the second required positive potential thereto has been removed from the conductor 625 by the operation of the NOR circuit as described above. The positive going voltage on the conductor 671 is however applied as an input to the AND circuit 372A, thus to provide a second positive input thereto which causes an output therefrom to appear on the conductor 873A. The output on the conductor 873A is applied to the multivibrator 785 as a HOLD ON potential to hold the multivibrator 785 active so long as the third control tone persists. The output on the conductor 873A is also applied to the Schmidt trigger 875A which applies the output thereof to the delay circuit 880A. Assuming that the third control tone persists for a time interval greater than the time duration of the delay from 880A, then upon cessation of the third control tone, the multivibrator 885A is tripped to provide an output on the conductor 735A. The output on the conductor 735A is a positive going voltage that is applied as an input to the filter 701, and specifically to the base of the transistor 730 to ready the filter 701 for reception of the fourth control tone. It is further noted that the multivibrator 685 at this time has assumed its normal condition, whereby to remove the positive potential from the base of the transistor 720, thus to remove this connection to the inductor 702, thus leaving the selection by the transistor 730 as the only connection to the inductor 702.

The circuit is now in condition for reception of the fourth control tone which is applied from the limiter 150 as a square wave on the conductor 165 to the filter 701. Assuming that the fourth tone is of the frequency selected by rendering the transistor 730 conducting, an output will be obtained on the conductor 709 that will be a sinusoidal wave having the frequency of the fourth control tone. This sinusoidal wave will be applied along the conductor 709 to the rectifier 770 and the output therefrom will be a positive going voltage applied to the conductor 771. Although this positive going voltage applied to the AND circuit 772, there will be no output therefrom since the second required output from the multivibrator 685 is now missing. The positive going voltage on the conductor 771 will be applied as a second input to the AND circuit 872B, the first positive input being from the multivibrator 885A as described above. There now is an output from the AND circuit 872B which appears on the conductor 873B, this output being applied back to the multivibrator 885A as a HOLD ON potential therefor in order to render this circuit active so long as the fourth tone is being received. The conduction from the AND circuit 872B also is applied to the Schmidt trigger circuit 875B, the output of which is applied to the delay circuit 880B. If the fourth tone persists for a time duration that exceeds the delay time of the circuit 880B, then upon the cessation of the fourth tone, the multivibrator 885B is tripped to provide a positive going output therefrom on the conductor 645. The output on the conductor 645 is applied to the filter 601, and specifically to the base of the transistor 640 to select tone No. 5, and is applied to the NOR circuit 800, and specifically to the base of the transistor 820 to cause conduction thereof so as to be sure that the transistor 620 is non-conducting, the transistor 630 being rendered non-conducting by the return of the multivibrator 785 to the normal condition thereof, whereby the only active connection in the filter 602 is that provided by the transistor 640 which selects the frequency of the fifth control tone. The output on the conductor 645 is also applied as one of the positive inputs to the circuit 872C forming a part of the tone selecting and responding circuit 870C.

Assuming that the fifth control tone of proper frequency is now received, it will be applied along the conductor 165 to the filter 601 that will provide an output on the conductor 609 in the form of a sinusoidal wave having a frequency of the fifth control tone. This output is rectified by the rectifier 670 to provide a positive voltage on the conductor 671, the AND circuits 672 and 872A not responding at this time since neither has the second positive voltage applied thereto. The positive going output is also applied as the second required input to the AND circuit 872C so as to provide an output therefrom on the conductor 873C. This output is applied to the multivibrator 885B to hold it in the active condition so long as the fifth tone is received, and is also applied as the input to the Schmidt trigger circuit 875C, which circuit operates to provide an input to the delay circuit 880C. Assuming that the fifth tone persists for a time duration greater than the time delay of the circuit 880C, then upon cessation of the fifth control tone, the multivibrator 885C operates to provide a positive going voltage on the output conductor 745. The positive going voltage on the conductor 745 is applied to the filter 701, and specifically, to the base of the transistor 740 to render the transistor 740 conductive, and thus to select the frequency for the sixth control tone. It is noted at this time that the multivibrator 885A has returned to its normal condition whereby to remove the potential from the conductor 735 so as to render the transistor 730 non-conducting. The output on the conductor 745 is also applied as one of the postive inputs to the AND circuit 872D forming a part of the tone selecting and responding circuit 870D.

Assuming that the sixth control tone of the proper frequency is now received, an output is applied along the conductor 165 to the filter 701 and there is derived therefrom a sine wave on the conductor 709 having a frequency corresponding to that of the sixth control tone. This sine wave is rectified by the rectifier 770 and applied to the conductor 771, the only AND circuit now in condition to act therefrom being the AND circuit 872D that now provides an output on the conductor 873D that is applied to the Schmidt trigger circuit 875D, the output from the Schmidt trigger circuit 875D being applied to the delay circuit 880D. It also is pointed out that the output on the conductor 873D is applied as a HOLD ON potential to the multivibrator 885C so that it is held in the active condition so long as the sixth control tone is received. Assuming that the sixth control tone persists for a time duration that exceeds the time delay of the circuit 880D, upon cessation of the sixth control tone the multivibrator 885D operates to provide a positive voltage on the conductor 655. The positive voltage on the conductor 655 is applied to the filter 601, specifically to the base of the transistor 650 to render it conducting, and is also applied to the NOR circuit 800 to ensure that the transistor 620 is rendered non-conducting by causing the transistor 830 to conduct. As a consequence, the only active connection in the filter 601 is that provided by the conducting transistor 650. The positive going signal on the conductor 655 is also applied as one of the positive required inputs to the combined Schmidt trigger and the AND circuit 980.

Assuming that the seventh control tone of the proper frequency is now received, an output is provided on the conductor 165 that is applied to the filter 601. Since the transistor 650 is now conducting to select the proper seventh control tone frequency, a sine wave output is obtained on the conductor 609 having a frequency corresponding to that of the seventh control tone. This output is rectified by the rectifier 670 to provide a positive voltage on the conductor 671. The only AND circuit now in condition to be activated by the application of the positive voltage from the conductor 671 is that in the combination Schmidt trigger and AND circuit 690 which is now operated to provide an output therefrom on the conductor 981. The output on the conductor 981 is applied as the HOLD ON potential for the multivibrator 885D, thereby to hold this circuit in the active condition so long as the seventh tone persists. The output on the conductor 981 is also applied to the delay circuit 985. If the seventh tone persists for a time interval that exceeds the time delay of the circuit 985, the delay circuit 985 operates to provide an output signal on the conductor 986 which will cause operation of the output control circuit 990. The output signal on the conductor 986 is operative to cause operation of the circuit 990 in the same manner as the control circuit 370 described above, thereby to energize the relay 130 and to connect the loud speaker 125 to the output of the transformer 120.

From the above, it will be seen that there has been provided an improved selective signal circuit generally and a tapped filter specifically and improved components therefor which will fulfill all of the objects and advantages set forth above.

Although there have been illustrated and described certain preferred embodiments of the invention, it is to be understood that various changes and modifications can be made therein without departing from the spirit and scope of the invention, and it is intended that all such changes and modifications be covered as fall within the scope of the appended claims.

What is claimed is:

1. A sequential-signal selective circuit for use in a communication system and comprising a signal responsive circuit having a plurality of terminals for varying the response characteristics of the signal responsive circuit, a first connector having a plurality of terminals fixedly coupled respectively to the terminals of said signal responsive circuit, a second connector having terminals matable with the terminals of said first connector, means associated with said second connector for substantially permanently interconnecting selected ones of the terminals thereof, said means being selectively arrangeable to interconnect selected terminals of said second connector and thereby interconnect corresponding terminals of said signal responsive circuit to establish the response characteristics thereof, and output circuit means coupled to said signal responsive circuit and responsive to a signal therefrom to produce a control signal, said signal responsive circuit having control input means for receiving a control signal to change the response characteristics of said signal responsive circuit in accordance with the arrangement of said interconnecting means.

2. A resonant circuit comprising impedance means having a plurality of terminals so as to provide different impedances between the terminals of said impedance means, a first connector having a plurality of terminals fixedly coupled respectively to the terminals of said impedance means, a plurality of electronic switching devices adapted to receive control signals to be controlled thereby, a second connector having a plurality of terminals fixedly coupled to said electronic switching devices, a third connector having first terminals matable with the terminals of said first connector and having second terminals matable with the terminals of said second connector, and means associated with said third connector for connecting selected ones of said first terminals to selected ones of said second terminals to establish the response characteristics of said resonant circuit.

3. A resonant circuit comprising first impedance means having an input terminal and a plurality of output terminals so as to provide different impedances between said input terminal and said output terminal, second impedance means having an output terminal and an input terminal, the input terminal of said second impedance means being connected to the input terminal of said first impedance means, a first connector having a plurality of terminals fixedly coupled respectively to the terminals of said first impedance means, a plurality of electronic switching devices each having a control eletrode and an output electrode and an input electrode, said control electrode being adapted to receive a control signal to cause said electronic switching device to switch and substantially couple said output electrode to said input electrode, a second connector having a plurality of terminals respectively fixedly coupled to the output electrode of said electronic switching devices, the input electrodes of said electronic switching devices being coupled together and to the output terminal of said second impedance means, a third connector having first terminals matable with the terminals of said first connector and having second terminals matable with the terminals of said second connector, and means associated with said third connector for connecting selected terminals to establish the response characteristics of said resonant circuit.

4. A tapped filter for use in a communications system and comprising an inductor having an input terminal and a plurality of taps thereon providing a corresponding plurality of inductances respectively between said taps and said input terminals, a capacitor having an output terminal and an input terminal, the input terminal of said capacitor being connected to said inductor input terminal, a first connector having a plurality of terminals fixedly coupled respectively to the taps on said inductor, a second connector having at least one terminal fixedly coupled to said capacitor output terminal, a third connector having a plurality of first terminals respectively matable with the terminals of said first connector and having at least one second terminal matable with said one terminal of said second connector, and means associated with said third connector for connecting said one second terminal to a selected one of said first terminals, whereby mating said third connector with said first and second connectors operates to connect a selected tap of said inductor to said capacitor output terminal, thereby to cause said filter to be tuned to a resonant frequency determined by the value of said capacitor and the value of the inductance between said inductor input terminal and said selected tap.

5. The tapped filter set forth in claim 4, wherein said taps are located on said inductor to cause each of said resonant frequencies to be a substantially fixed percentage greater than the next lower one of said resonant frequencies.

6. A tapped filter for use in a communications system and comprising an inductor having an input terminal and a plurality of taps thereon providing a corresponding plurality of inductances respectively between said taps and said input terminal, a capacitor having an input terminal connected to said inductor input terminal and having an output terminal, and a movable connection for interconnecting said capacitor output terminal to a selected one of said taps, thereby to cause said filter to be tuned to a resonant frequency determined by the value of said capacitor and the value of the inductance between said inductor input terminal and said selected tap, said taps being located on said inductor to cause each resonant frequency to be a substantially fixed percentage greater than the next lower one of said resonant frequencies.

7. The tapped filter set forth in claim 6, wherein said fixed percentage is about 3⅓%.

8. A resonant circuit comprising a first impedance element having an input terminal and a plurality of taps therein providing a corresponding plurality of impedances respectively between said taps and said input terminal, a second impedance element having an output terminal and having an input terminal connected to the input terminal of said first impedance element, and a movable connection for interconnecting the output terminal of said second impedance element to a selected one of said taps, thereby to cause said resonant circuit to be tuned to a resonant frequency determined by the value of the impedance between the input terminal of said first impedance element and said selected tap thereon, said taps being located on said first impedance element to cause each resonant frequency to be a substantially fixed percentage greater than the next lower one of said resonant frequencies.

9. A tapped filter for use in a communications system and comprising a first impedance element having an input terminal and a plurality of taps therein providing a corresponding plurality of impedances respectively between said taps and said input terminal, a second impedance element having an output terminal and having an input terminal connected to the input terminal of said first impedance element, and a movable connection for interconnecting the output terminal of said second impedance element to a selected one of said taps, thereby to cause said filter to be tuned to a resonant frequency determined by the value of said second impedance element and the value of the impedance between the input terminal of said first impedance element and said selected tap thereon, said taps being located on said first impedance element to cause each resonant frequency to be a substantially fixed percentage greater than the next lower one of said resonant frequencies.

10. A tapped filter for use in a communications system and comprising an inductor having an input terminal and a plurality of taps thereon providing a corresponding plurality of inductances respectively between said taps and said input terminal, a capacitor having an output terminal and an input terminal, the input terminal of said capacitor being connected to said inductor input terminal, and a plurality of electronic switching devices each having first and second output electrodes and a control electrode, said first output electrodes being respectively coupled to said taps, and said second output electrodes being coupled to said capacitor output terminal, a selected electronic switching device being responsive to the application of a bias signal to the control electrode thereof to cause said filter to be tuned to a resonant frequency determined by the value of said capacitor and the value of the inductance between said inductor input terminal and the tap associated with the selected electronic switching device, said taps being located on said inductor to cause each of said resonant frequencies to be a substantially fixed percentage greater than the next lower one of said resonant frequencies.

11. The tapped filter set forth in claim 10, wherein said fixed percentage is about 3⅓%.

12. The tapped filter set forth in claim 10, wherein each of said electronic switching devices is a transistor having emitter and collector electrodes corresponding to said output electrodes and having a base electrode corresponding to said control electrode.

13. A tapped filter for use in a communications system and comprising an inductor having an input terminal and a plurality of taps thereon providing a corresponding plurality of inductances respectively between said taps and said input terminal, a capacitor having an input terminal connected to said inductor input terminal and having an output terminal, and a movable connection for interconnecting said capacitor output terminal to a selected one of said taps, thereby to cause said filter to be tuned to a resonant frequency determined by the value of said capacitor and the value of the inductance between said inductor input terminal and said selected tap, the number of turns of wire between each tap and said inductor input terminal being a fixed percentage greater than the number of turns of wire between an adjacent tap and said inductor input terminal, thereby to cause each resonant frequency to be a substantially fixed percentage greater than the next lower one of said resonant frequencies.

* * * * *

UNITED STATES PATENT OFFICE
CERTIFICATE OF CORRECTION

PATENT NO. : 3,932,824
DATED : January 13, 1976
INVENTOR(S) : Keith H. Wycoff

It is certified that error appears in the above-identified patent and that said Letters Patent are hereby corrected as shown below:

itle page, column 1, add to the list of United States Patents under "references Cited", --3,513,443 5/1970 Anderson. . . . . . 340/164;
itle page, bottom of column 1, add the following heading and citation: --OTHER PUBLICATIONS
Motorola Instruction Manual entitled "Portable Remote Controls" No. 68P81038A10--;
olumn 1, line 10, after "improved" insert --TAPPED--;
olumn 2, line 62, after "2274" insert --,--;
olumn 3, line 52, "20-300" should be --200-300--;
olumn 7, line 64, "cndition" should be --condition--;
olumn 9, line 68, "monstable" should be --monostable--;
olumn 11, line 6, "562" should be --462--;
olumn 12, line 56, after "is" insert --so--;
olumn 12, line 64, after "provide" insert --a constant--;
olumn 15, line 40, "correspondind" should be --corresponding--;
olumn 21, line 45, "eletrode" should be --electrode--; and Signed and Sealed this twenty-second Day of June 1976

[SEAL]

Attest:

RUTH C. MASON
Attesting Officer

C. MARSHALL DANN
Commissioner of Patents and Trademarks